United States Patent
Reynolds et al.

[11] Patent Number: 5,958,220
[45] Date of Patent: Sep. 28, 1999

[54] GAS-POCKET DISTRIBUTOR AND METHOD FOR HYDROPROCESSING A HYDROCARBON FEED STREAM

[75] Inventors: Bruce E. Reynolds, Martinez; Bruce E. Stangeland, Berkeley; Krishniah Parimi, Concord; Robert W. Bachtel, El Cerrito, all of Calif.

[73] Assignee: Chevron U.S.A. Inc., San Francisco, Calif.

[21] Appl. No.: 09/198,592

[22] Filed: Nov. 23, 1998

Related U.S. Application Data

[62] Division of application No. 08/617,464, Mar. 18, 1996, Pat. No. 5,885,534.

[51] Int. Cl.[6] .................................................. C10G 47/02
[52] U.S. Cl. ..................... 208/108; 208/213; 208/215; 208/216; 208/217; 208/251 H; 208/254 H; 585/921; 585/922
[58] Field of Search ....................................... 208/108, 213, 208/215, 216, 217, 251 H, 254 H; 585/921, 922

[56] References Cited

U.S. PATENT DOCUMENTS

| | | | |
|---|---|---|---|
| 2,567,207 | 9/1951 | Hoge | 196/52 |
| 2,631,968 | 3/1953 | Peery | 196/52 |
| 2,688,401 | 9/1954 | Schmitkons et al. | 209/172 |
| 2,882,912 | 4/1959 | Reeg et al. | 134/155 |
| 2,987,465 | 6/1961 | Johanson | 208/10 |
| 2,987,470 | 6/1961 | Turken | 208/253 |
| 3,197,288 | 7/1965 | Johanson | 23/289 |
| 3,336,217 | 8/1967 | Meaux | 208/143 |
| 3,398,085 | 8/1968 | Engle | 208/157 |
| 3,410,791 | 11/1968 | Perry et al. | 208/143 |
| 3,410,792 | 11/1968 | Van Driesen et al. | 208/143 |
| 3,441,498 | 4/1969 | Jubin, Jr. et al. | 208/143 |
| 3,470,090 | 9/1969 | Carson | 208/138 |
| 3,489,674 | 1/1970 | Borst, Jr. | 208/108 |
| 3,523,888 | 8/1970 | Stewart | 208/157 |
| 3,524,731 | 8/1970 | Effron et al. | 23/288 |
| 3,541,002 | 11/1970 | Rapp | 208/143 |
| 3,652,450 | 3/1972 | Boyd | 208/146 |
| 3,652,451 | 3/1972 | Boyd | 208/146 |
| 3,685,971 | 8/1972 | Carson | 23/288 |
| 3,705,016 | 12/1972 | Ludwigsen et al. | 23/283 |
| 3,716,478 | 2/1973 | Kodera et al. | 208/152 |
| 3,723,072 | 3/1973 | Carson et al. | 23/288 |
| 3,725,247 | 4/1973 | Johnnson et al. | 208/111 |
| 3,730,880 | 5/1973 | Van der Toorn et al. | 208/213 |
| 3,841,981 | 10/1974 | Layng | 208/48 |
| 3,870,623 | 3/1975 | Johnson et al. | 208/108 |
| 3,873,441 | 3/1975 | Jones | 208/166 |
| 3,880,598 | 4/1975 | van der Toorn et al. | 23/289 |
| 3,887,455 | 6/1975 | Hamner et al. | 208/112 |
| 3,893,911 | 7/1975 | Rovesti et al. | 208/251 |
| 3,915,847 | 10/1975 | Hutchings | 208/146 |
| 3,915,894 | 10/1975 | Clements et al. | 252/439 |
| 3,932,269 | 1/1976 | Lehman | 208/157 |
| 3,966,420 | 6/1976 | Pegels et al. | 23/288 |
| 3,972,803 | 8/1976 | Wolk et al. | 208/97 |
| 3,977,834 | 8/1976 | Alcock et al. | 23/288 |
| 4,016,106 | 4/1977 | Sawyer et al. | 252/455 |
| 4,051,019 | 9/1977 | Johnson | 208/146 |
| 4,059,502 | 11/1977 | James | 208/152 |
| 4,119,530 | 10/1978 | Czajkowski et al. | 208/213 |
| 4,167,474 | 9/1979 | Sikonia | 208/140 |
| 4,172,024 | 10/1979 | Simone et al. | 208/10 |
| 4,188,283 | 2/1980 | Czajkowski et al. | 208/143 |
| 4,212,835 | 7/1980 | Koros | 261/116 |
| 4,213,850 | 7/1980 | Riddick, Jr. et al. | 208/216 |
| 4,217,206 | 8/1980 | Nongbri | 208/251 |
| 4,259,294 | 3/1981 | Van Zijll Langhout et al. | 422/190 |
| 4,287,088 | 9/1981 | Sirkar | 252/414 |
| 4,312,741 | 1/1982 | Jacquin | 208/11 |
| 4,344,840 | 8/1982 | Kunesh | 208/59 |
| 4,392,943 | 7/1983 | Euzen et al. | 208/152 |
| 4,398,852 | 8/1983 | Milligan | 406/47 |
| 4,411,768 | 10/1983 | Unger et al. | 208/59 |
| 4,411,771 | 10/1983 | Bambrick et al. | 208/112 |
| 4,422,960 | 12/1983 | Shiroto et al. | 502/206 |
| 4,444,653 | 4/1984 | Euzen et al. | 208/152 |
| 4,478,707 | 10/1984 | Bischoff et al. | 208/157 |
| 4,481,105 | 11/1984 | Chou | 208/146 |
| 4,502,946 | 3/1985 | Pronk | 208/152 |
| 4,540,547 | 9/1985 | Schuurman | 422/49 |
| 4,571,326 | 2/1986 | Bischoff et al. | 422/207 |
| 4,573,721 | 3/1986 | McDaniel et al. | 208/143 |
| 4,576,710 | 3/1986 | Nongbri et al. | 208/58 |
| 4,590,045 | 5/1986 | van der Wal et al. | 422/216 |
| 4,639,354 | 1/1987 | Bischoff et al. | 422/140 |

| | | | | | | | |
|---|---|---|---|---|---|---|---|
| 4,664,782 | 5/1987 | Galiasso et al. | 208/143 | 099 800 | 2/1984 | European Pat. Off. | |
| 4,684,456 | 8/1987 | Van Driesen et al. | 208/143 | 099800 | 2/1984 | European Pat. Off. | |
| 4,685,842 | 8/1987 | Smith et al. | 406/106 | 1933857 | 1/1971 | Germany. | |
| 4,687,382 | 8/1987 | Smith | 40/168 | 1 550 285 | 8/1995 | United Kingdom. | |
| 4,716,142 | 12/1987 | Laine et al. | 502/220 | WO 95/29970 | 11/1995 | WIPO. | |
| 4,725,571 | 2/1988 | Tuszynski | 502/220 | WO 95/35160 | 12/1995 | WIPO. | |
| 4,738,770 | 4/1988 | Hastings et al. | 208/152 | | | | |
| 4,744,887 | 5/1988 | van Driesen et al. | 208/152 | | | | |
| 4,767,523 | 8/1988 | Kukes et al. | 208/217 | | | | |
| 4,808,297 | 2/1989 | Chen | 208/164 | | | | |
| 4,820,676 | 4/1989 | Kukes et al. | 502/220 | | | | |
| 4,875,995 | 10/1989 | Van Driesen et al. | 208/152 | | | | |
| 4,960,571 | 10/1990 | Bhagat et al. | 422/194 | | | | |
| 4,968,409 | 11/1990 | Smith | 208/157 | | | | |
| 5,008,003 | 4/1991 | Smegal et al. | 208/254 | | | | |
| 5,021,147 | 6/1991 | Van Driesen et al. | 208/152 | | | | |
| 5,045,518 | 9/1991 | Heinerman et al. | 502/216 | | | | |
| 5,076,908 | 12/1991 | Stangeland et al. | 208/148 | | | | |
| 5,098,230 | 3/1992 | Scheuerman | 406/143 | | | | |
| 5,100,629 | 3/1992 | Tampa | 422/140 | | | | |
| 5,209,840 | 5/1993 | Sherwood, Jr. et al. | 208/210 | | | | |
| 5,232,673 | 8/1993 | Notestine | 422/216 | | | | |
| 5,270,018 | 12/1993 | Scheuerman | 422/213 | | | | |
| 5,308,476 | 5/1994 | Buttke et al. | 208/157 | | | | |
| 5,409,598 | 4/1995 | Kramer et al. | 208/148 | | | | |
| 5,472,928 | 12/1995 | Scheuerman et al. | 502/305 | | | | |
| 5,492,617 | 2/1996 | Trimble et al. | 208/148 | | | | |
| 5,498,327 | 3/1996 | Stangeland et al. | 208/148 | | | | |
| 5,527,512 | 6/1996 | Bachtel et al. | 422/143 | | | | |
| 5,545,382 | 8/1996 | Sechrist | 422/216 | | | | |

FOREIGN PATENT DOCUMENTS 1 217 756   2/1987   Canada .

*Primary Examiner*—Walter D. Griffin
*Assistant Examiner*—Tung Doan
*Attorney, Agent, or Firm*—Alan W. Klaassen

[57]   ABSTRACT

A distributor assembly for hydroprocessing a hydrocarbon mixture of hydrogen-containing gas and liquid hydrocarbon is presented. The distributor assembly has a circular plate with a plurality of hollow risers bound thereto for distributing hydrogen-containing gas and liquid hydrocarbon through openings in the circular plate member. Each of the hollow risers has a tubular opening In its associated side. The distributor assembly is connected to an internal wall of a reactor. A method is also presented for hydroprocessing a hydrocarbon feed stream comprising flowing a mixture of hydrogen-containing gas and liquid hydrocarbon into a reactor zone to produce evolved hydrogen-containing gas; and flowing the mixture of hydrogen-containing gas and liquid hydrocarbon through a plurality of tubular zones while admixing simultaneously therewith the evolved hydrogen-containing gas.

3 Claims, 7 Drawing Sheets

GAS-POCKET DISTRIBUTOR AND METHOD FOR HYDROPROCESSING A HYDROCARBON FEED STREAM

This application is a divisional application of U.S. Ser. No. 08/617,464, filed Mar. 18, 1996, now U.S. Pat. No. 5,835,534, the entire disclosure of which is incorporated herein by references for all purposes.

BACKGROUND OF THE INVENTION

1. Field of the Invention

The present invention relates to a gas-pocket distributor assembly for distributing a mixture of liquid hydrocarbons and hydrogen-containing gas(es). More particularly, the present invention provides for an improved gas-pocket distributor assembly, a reactor containing the improved gaspocket distributor assembly, and a method for hydroprocessing a hydrocarbon feed stream.

2. Description of the Prior Art

Hydroprocessing or hydrotreatment to remove undesirable components from hydrocarbon feed streams is a well known method of catalytically treating such heavy hydrocarbons to increase their commercial value. "Heavy" hydrocarbon liquid streams, and particularly reduced crude oils, petroleum residua, tar sand bitumen, shale oil or liquified coal or reclaimed oil, generally contain product contaminants, such as sulfur, and/or nitrogen, metals and organo-metallic compounds which tend to deactivate catalyst particles during contact by the feed stream and hydrogen under hydroprocessing conditions. Such hydroprocessing conditions are normally in the range of 212 degree(s) F. to 1200 degree(s) F. (100 degree(s) to 650 degree(s) C.) at pressures of from 20 to 300 atmospheres. Generally such hydroprocessing is in the presence of catalyst containing group VI or VIII metals such as platinum, molybdenum, tungsten, nickel, cobalt, etc., in combination with various other metallic element particles of alumina, silica, magnesia and so forth having a high surface to volume ratio. More specifically, catalyst utilized for hydrodemetallation, hydrodesulfurization, hydrogenitrification, hydrocracking, etc., of heavy oils and the like are generally made up of a carrier or base material; such as alumina, silica, silica-alumina, or possibly, crystalline aluminosilicate, with one or more promoter(s) or catalytically active metal(s) (or compound(s)) plus trace materials. Typical catalytically active metals utilized are cobalt, molybdenum, nickel and tungsten; however, other metals or compounds could be selected dependent on the application.

Because these reactions must be carried out by contact of a hydrogen-containing gas with the hydrocarbon feed stream at elevated temperatures and pressures, the major costs of such processing are essentially Investment in vessels and associated furnaces, heat exchangers, distributor plate assemblies, pumps, piping and valves capable of such service and the replacement cost of catalyst contaminated in such service, and the cost of assembling the equipment. Commercial hydroprocessing of relatively low cost feed stocks such as reduced crude oils containing pollutant compounds, requires a flow rate on the order of a few thousand up to one hundred thousand barrels per day, with concurrent flow of hydrogen at up to 10,000 standard cubic feet per barrel of the liquid feed. Vessels capable of containing such a reaction process are accordingly cost-intensive both due to the need to contain and withstand corrosion and metal embrittlement by the hydrogen and sulfur compounds, while carrying out the desired reactions, such as demetallation, denitrification, desulfurization, and cracking at elevated pressure and temperatures. Pumps, piping and valves for handling fluid streams containing hydrogen at such pressures and temperatures are also costly, because at such pressures seals must remain hydrogen impervious over extended service periods of many months. It is also cost-intensive to insure that all of the equipment including distributor plate assemblies are assembled and/or manufactured correctly. It is important in such prior art distributor plate assemblies that they are essentially perfectly level to immunize flow distribution of the hydrocarbon feed streams from their sensitivity to the levelness of the distributor plate assembly.

As particularly distinguished from prior known methods of hydroprocessing, the method and apparatus in U.S. Pat. No. 5,076,908 to Stangeland et al more specifically provides a system wherein downward plug-flow of the catalyst bed is maintained over a wide range of counterflow rates of a hydrocarbon feed stream and hydrogen gas throughout the volume of the substantially packed catalyst bed. Such packed bed flow maintains substantially maximum volume and density of catalyst within a give vessel's design volume by controlling the size, shape and density of the catalyst so that the bed is not substantially expanded at the design rate of fluid flow therethrough.

The prior art does not disclose or suggest the above enumerated and pertinent features of either the total system or significant portions of such a system in U.S. Pat. No. 5,076,908 to Stangeland et al, as disclosed by the following patents:

Jacquin et al U.S. Pat. No. 4,312,741, is directed toward a catalyst replacement method in a hydroprocessing system by controlling the feed of hydrogen gas at one or more levels. Catalyst, as an ebullated bed counterflows through the reactor but is slowed at each of several levels by horizontally constricted areas which increase the hydrogen and hydrocarbon flow rates to sufficiently locally slow downward flow of catalyst. While local recycling thus occurs at each such stage, rapid through-flow of fresh catalyst, with resultant mixing with deactivated or contaminated catalyst, is suppressed. The ebullating bed aids simple gravity withdrawal of catalyst from the vessel. Improvement of the disclosed system over multiple vessels with valves between stages is suggested to avoid the risk of rapid wear and deterioration of valve seals by catalyst abrasion.

Kodera et al, U.S. Pat. No. 3,716,478, discloses low linear velocity of a mixed feed of liquid and $H_2$ gas to avoid expansion (or contraction) of catalyst bed. By low linear velocity of fluid upflow, gas bubbles are controlled by flow through the packed bed, but the bed is fluidized by forming the bottom with a small cross-sectional area adjacent the withdrawal tube. This assists discharge of catalyst without backmixing of contaminated catalyst with fresh catalyst at the top of the single vessel. The range of bed level in the vessel is from 0.9 to 1.1 of the allowable bed volume (±10%) due to fluid flow through the bed. A particular limitation of the system is that flow of the fluids undergoing catalytic reaction is restricted to a rate that will not exceed such limits, but must be adequate to ebullate the bed adjacent the catalyst withdrawal tube. Alternatively, injection of auxiliary fluid from a slidable pipe section is required. The patentees particularly specify that the diameter of the lower end of the vessel is smaller to increase turbulence and ebullation of catalyst adjacent the Inlet to the catalyst withdrawal line. Fluidization of catalyst is accordingly indicated to be essential to the process. However, the disclosed gas flow rates are well below commercial flow rates and there is no suggestion of temperatures or pressures used in the tests or the size, density or shape of the catalyst.

Bischoff et al, U.S. Pat. No. 4,571,326, is directed to an apparatus for withdrawing catalyst through the center of a catalyst bed counterflowing to a liquid hydrocarbon and gas feed stream. The system is particularly directed to arrangements for assuring uniform distribution of hydrogen gas with the liquid feed across the cross-sectional area of the bed. Such uniform distribution appears to be created because the bed is ebullating under the disclosed conditions of flow. Accordingly, considerable reactor space is used to initially mix the gas and hydrocarbon liquid feeds in the lower end of the vessel before flowing to other bottom feed distributors. The feeds are further mixed at a higher level by such distributor means in the form of "Sulzer Plates" or a "honeycomb" of hexagonal tubes beneath a truncated, conical, or pyramidal-shaped funnel screen. The arrangement may include an open ramp area parallel to the underside of the screen between the tube or plate ends. Further, to maintain gas distributions along the length of the catalyst bed, quench gas is supplied through upflowing jets in star-shaped or annular headers extending across middle portions of the vessel. The arrangement for withdrawal of spent catalyst requires ebullation of at least the lower portion of the bed. As noted above, added vessel space for uniform mixing of hydrogen and feed before introducing the fluids into an ebullated bed, as well as an ebullating bed, increases the required size of the hydroprocessing vessel, increases catalyst attrition, increases catalyst bed mixing and substantially increases initial, and continuing operating costs of the system.

Bischoff et al, U.S. Pat. No. 4,639,354, more fully describes a method of hydroprocessing, similar to U.S. Pat. No. 4,571,326, wherein similar apparatus obtains uniform ebullation through the vertical height of a catalyst bed, including a quench gas step.

Meaux U.S. Pat. No. 3,336,217, is particularly directed to a catalyst withdrawal method from an ebullating bed reactor. In the system, catalyst accumulating at the bottom of a vessel and supported on a flat bubble-tray may be withdrawn through an inverted J-tube having a particular ratio of the volume of the short leg of the J-tube to the longer leg. The diameter of the J-tube is suited only to flow of catalyst from a body of catalyst ebullated by the upflowing hydrocarbon feed and gas.

U.S. Pat. Nos. 4,444,653 and 4,392,943, both to Euzen, et al, disclose removal systems for catalyst replacement in an ebullating bed. In these patents, the fluid charge including hydrocarbon containing gas is introduced by various arrangements of downwardly directed jets acting laterally against or directly onto the conical upper surface of the bed support screen or screens. Alternatively, the feed is introduced through a conical screen after passing through a distributor arrangement of tortuous paths or a multiplicity of separate tubes to mix the gas and liquid feed over the conical screen. Such arrangements use a considerable volume of the pressure vessel to assure such mixing.

U.S. Pat. Nos. 3,730,880 and 3,880,569, both to Van der Toorn, et al, disclose a series of catalytic reactors wherein catalyst moves downwardly by gravity from vessel to vessel through check valves. As noted above, such valves require opening and closing to regulate the rate of flow, or to start and stop catalyst transfer, with catalyst in the valve flow path. Feed of process fluids is either co-current or counter-current through the catalyst bed.

Van ZijllLanghaut et al, U.S. Pat. No. 4,259,294, is directed to a system for continuous or periodic replacement of catalyst by entrainment of the catalyst in oil pumped as a slurry either to withdraw catalyst from or to supply fresh catalyst to, a reactor vessel. Reacting feed is suggested to be either co-current or countercurrent with catalyst flow through the reactor. Valves capable of closing with catalyst in the line, or after back-flow or slurry oil, are required to seal off the catalyst containing vessel at operating temperatures and pressures from the receiving reactor vessel, or isolate the catalyst receiving lock hopper from the withdrawal section of the vessel.

Carson, U.S. Pat. No. 3,470,900, and Sikama, U.S. Pat. No. 4,167,474, respectively illustrate multiple single bed reactors and multi-bed reactors In which catalyst is replaced either continuously or periodically. The feed and catalyst flow co-currently and/or radially. Catalyst is regenerated and returned to the reactor, or disposed of. No catalyst withdrawal system is disclosed apart from either the configuration of the internal bed support or the shape of the vessel bottom to assist gravity discharge of catalyst.

One of the basic principles and teachings of Stangeland et al in U.S. Pat. No. 5,076,908, is that by specifically selecting the size, shape, and density of the catalyst pellets, combined with appropriate control of process liquid and gas velocities, random motion and backmixing of the catalyst can be minimized, and plugflow characteristics of the catalyst downward and the liquid and gas flow upward, maximized. Stangeland et al economically utilizes space within a hydroprocessing vessel over a wide range of processing rates without substantial random motion or ebullation of a packed bed of catalyst during high counterflow rates of the hydrocarbon feed and a hydrogen containing gas through the packed bed, while maintaining continuous or intermittent replacement of catalyst for plug-like flow of the bed through the vessel. Such plug flow with high processing rates is obtained by Stangeland et al by selecting the size, shape and density of the catalyst particles to prevent ebullation and bed expansion at the design flow rate so as to maximize the amount of catalyst in the vessel during normal operation and during catalyst transfer. Catalysts are selected utilizing data gained while studying catalyst bed expansion, such as in a large pilot plant run, with liquid hydrocarbon, hydrogen and catalyst at the design pressures and flow velocities within the available reaction volume of the vessel. Catalyst is removed from the bed by Stangeland et al through laminar flow of the catalyst particles in a liquid slurry system in which the liquid flow line is uniform in diameter, and substantially larger than the catalyst particles, throughout the flow path between the reactor vessel and a pressurizable vessel including passageways through the flow control valves.

However, the method and apparatus disclosed by Stangeland et al in U.S. Pat. No. 5,076,908, as well as the methods and apparatus(es) taught by the above-identified prior art patents relating to U.S. Pat. No. 5,076,908 to Stangeland, et al, all teach and/or suggest a distributor plate assembly that should be essentially level in a reactor vessel containing the distributor plate assembly. Flow distribution of a hydrocarbon feed stream passing through a distributor plate assembly is sensitive to the levelness of the distributor plate assembly within the reactor vessel. Even for a perfectly level plate, gas flow would pulse because of sloshing and varying liquid level. If the distributor plate assembly is not level, distribution of the hydrocarbon feed stream throughout an associated catalyst bed within the reactor vessel is affected. Also, these prior art hydroprocessing methods and apparatuses are saddled at times with hydrogen-containing gas bubbles that are too large, which also could affect the distribution of the hydrocarbon feed stream throughout a catalyst bed within the reactor vessel. Therefore, what is needed and what has been invented is a method and an apparatus or distributor assembly that is capable of producing an excellent, steady and smooth flow of a mixture of a gas, (e.g. a hydrogen-containing gas) and a liquid (e.g. a liquid hydrocarbon) into a chamber (e.g. a plenum chamber) without the indicated deficiencies associated with the prior art methods and apparatuses.

SUMMARY OF THE INVENTION

The present invention accomplishes its desired objects by providing a distributor assembly for hydroprocessing a hydrocarbon mixture of hydrogen-containing gas and liquid hydrocarbon flowing through a hydroconversion reaction zone containing a bed of catalyst. The distributor assembly includes a plate member having a structure defining at least one opening; and at least one tube member having a tubular bore and bound to the plate member such that the tubular bore communicates with the at least one opening. The at least one tube member has a pair of open ends and at least one tubular opening in a side thereof. The tube member has a tubular axis and the tubular opening which has an opening axis that is generally normal to the tubular axis. The apparatus, as well as the method, of the present invention may be employed for mixing any gas in any liquid, such as aeration ponds, adding $CO_2$ to reactors, etc.

The present invention further accomplishes its desired objects by broadly providing a reactor comprising a vessel with an internal cylindrical wall; and a catalyst bed support means secured to the internal cylindrical wall of the vessel for supporting a catalyst bed. The distributor assembly is secured to the internal cylindrical wall of the vessel.

The present invention also further accomplishes its desired objects by providing a method for hydroprocessing a hydrocarbon feed stream that is flowing through a hydroconversion reaction zone having a bed of catalyst, which method comprises the steps of: forming at least one tubular zone in a reactor zone containing a hydrocarbon reaction zone having a bed of catalyst; flowing a mixture of hydrogen-containing gas and liquid hydrocarbon into the reactor zone to produce evolved hydrogen-containing gas; and flowing the mixture of hydrogen-containing gas and liquid hydrocarbon through the at least one tubular zone while admixing therewith, preferably simultaneously admixing therewith, the evolved hydrogen-containing gas.

Whenever the term "evolved hydrogen-containing gas" is stated in the specification and/or the claims, it is not to unduly limit the spirit and scope of the present invention and is intended to mean not only hydrogen gas that has evolved from the liquid hydrocarbon that is being introduced into a reactor simultaneously therewith, but also hydrogen gas that did not evolve from the liquid hydrocarbon and is at least part of the hydrogen-containing gas itself that is being introduced into the reactor along with the liquid hydrocarbon. Thus, "evolved hydrogen-containing gas" comprises the hydrogen-containing gas that is being introduced into a reactor along with the liquid hydrocarbon, any hydrogen gas that has evolved from the liquid hydrocarbon itself, and hydrogen-containing gas that solutionized and/or dissolved into and/or with the liquid hydrocarbon and which has subsequently evolved from the liquid hydrocarbon, especially after introduction Into the reactor.

It Is therefore an object of the present invention to provide a distributor assembly for hydroprocessing a hydrocarbon mixture of hydrogen-containing gas and liquid hydrocarbon.

It is another object of the present invention to provide a reactor containing the distributor assembly for hydroprocessing a hydrocarbon mixture of hydrogen-containing gas and liquid hydrocarbon.

It is also further an object of the present invention to provide a method for hydroprocessing a hydrocarbon feed stream that is flowing, preferably upflowing, through a hydroconversion reaction zone having a bed of catalyst.

These, together with the various ancillary objects and features that will become apparent to those artisans skilled in the art as the following description proceeds, are attained by the present invention, a preferred embodiment as shown with reference to the accompanying drawings, by way of example only, wherein:

DETAILED DESCRIPTION OF THE INVENTION INCLUDING

Figure 1:
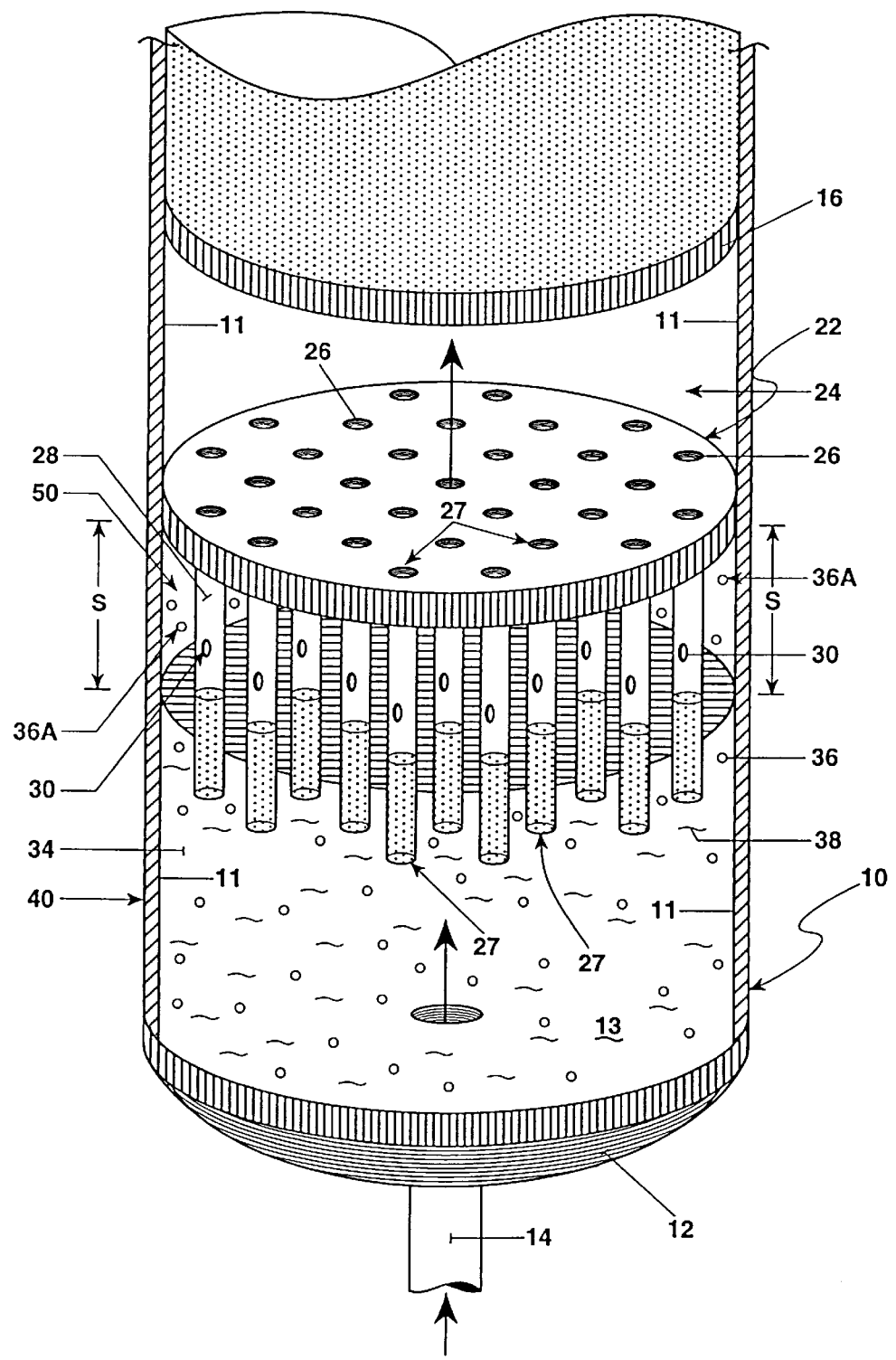
FIG. 1 is a partial perspective sectional view of the reactor of the present invention having a distributor plate assembly with a plurality of depending hollow risers, with each riser having an opening wherethrough evolved hydrogen-containing gas flows to be admixed with a mixture of liquid hydrocarbon and hydrogen-containing gas.

Preferred and/or Best Mode Embodiments of the Invention

Referring in detail now to the drawings wherein similar parts of the invention are identified by like reference numerals, there is seen a reactor vessel, generally illustrated as 10. Reactor vessel 10 includes an internal generally cylindrical wall 11 and a bottom domed closure 12 with an internal surface 13. The bottom domed closure 12 is secured to the internal generally cylindrical wall 11. The reactor vessel 10 is designed to react a hydrogen-containing gas 36 mixed with a liquid hydrocarbon stream 38 at a pressure of up to about 300 atmospheres (about 4500 lbs. per square inch) and up to about 650° C. (about 1200° F.). For such reaction, hydrogen-containing gas 36 and liquid hydrocarbon stream 38 are preferably premixed and introduced as a single stream (i.e. a single two-phase flow) through the bottom domed closure 12 by a conduit 14 secured coaxially thereto such as to have a concentric disposition with respect to the reactor vessel 10.

The reactor vessel 10 contains a catalyst bed support means, generally illustrated as 16, for supporting a catalyst bed 18 and containing appropriate openings (not shown) well known to the artisans in the art. The catalyst bed support means 16 contained in the reactor vessel 10 may be of any suitable geometric shape, such as concentric rings, conical, pyramidal, truncated polygonal or conical, frusto-conical, etc. The catalyst bed support means 16 further may be of any type that preferably insures even and equal distribution of hydrogen-containing gas 36 and liquid hydrocarbon stream 38 across a full cross-sectional area of the catalyst bed 18. Thus, the particular geometric shape or type of the catalyst bed support means 16 is not to unduly limit the spirit and scope of the present invention.

To assure maximum catalytic benefit during the hydroprocessing of the hydrogen-containing gas 36 and the liquid hydrocarbon stream 38, it is preferred that the reactor vessel 10 contain as much catalyst as possible within the design volume of the reactor vessel 10. Accordingly, it is preferred that the catalyst bed support means 16 for the catalyst bed 18 be placed as low as possible in the reactor vessel 10 while assuring full and adequate dispersion of the hydrogen-containing gas 36 within the liquid hydrocarbon stream 38.

The upper level of the catalyst bed 18 is to be controlled such that ebullation, expansion, or fluidization of the catalyst bed 18 is minimized and that undesirable excursions from the design flow rate for hydrogen-containing gas 36 and liquid hydrocarbon stream 38 flowing upwardly through the catalyst bed 18 are avoided for the selected catalyst. For this accomplishment and as discussed in detail in U.S. Pat. No. 5,472,928, issued Dec. 5, 1995 and which is fully incorporated herein by reference thereto as if repeated verbatim immediately hereafter, the size, shape, and density of the catalyst particles within the catalyst bed 18 are to be essentially uniform and are selected in accordance with the designed maximum rate of flow of feed streams or a mixture 34 of the hydrogen-containing gas 36 and the liquid hydrocarbon stream 38 to prevent ebullation, expansion, or fluidization of the catalyst bed 18 while the latter progressively moves down through the reactor vessel 10 in layers by plug flow.

Figure 4:
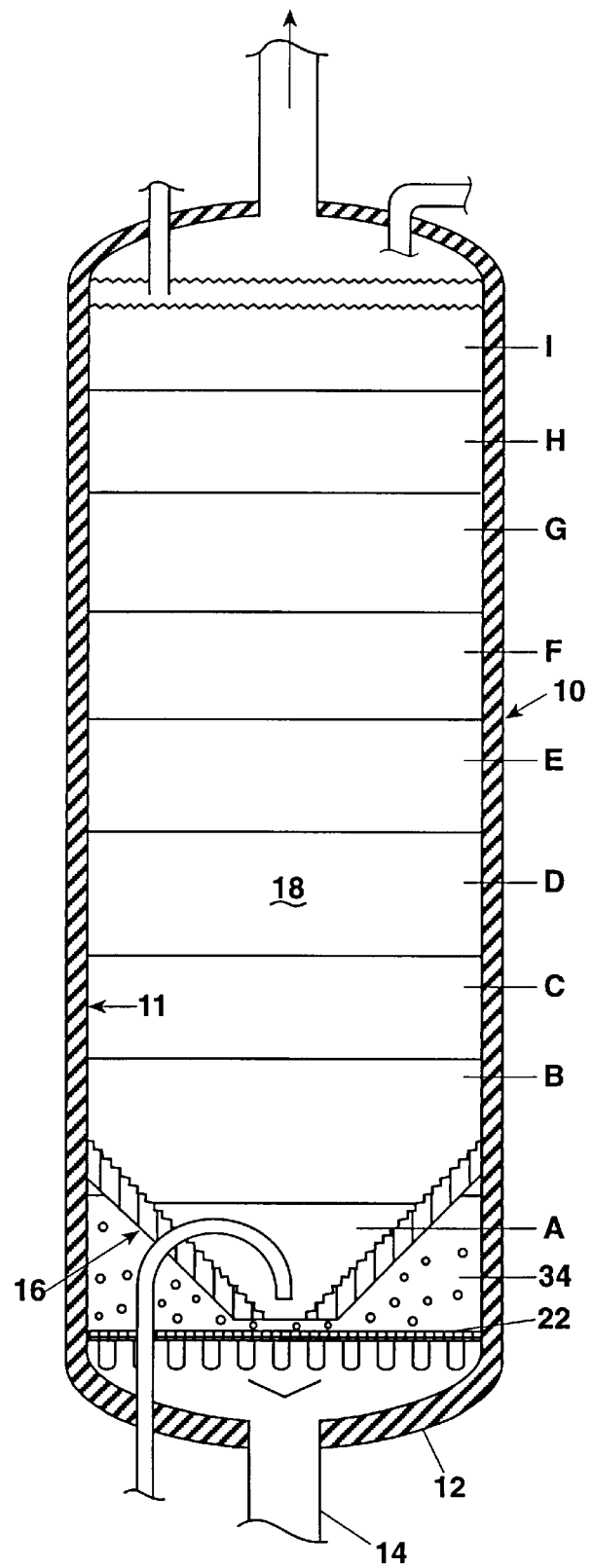
FIG. 4 Is a partial cross-sectional view of the reactor in FIG. 8 of copending patent application Ser. No. 08/497,638 filed Jun. 30, 1995, now U.S. Pat. No. 5,599440, illustrating a catalytic bed with a plurality of superimposed layers with respect to each other before commencement of a plug-flow.
Figure 5:
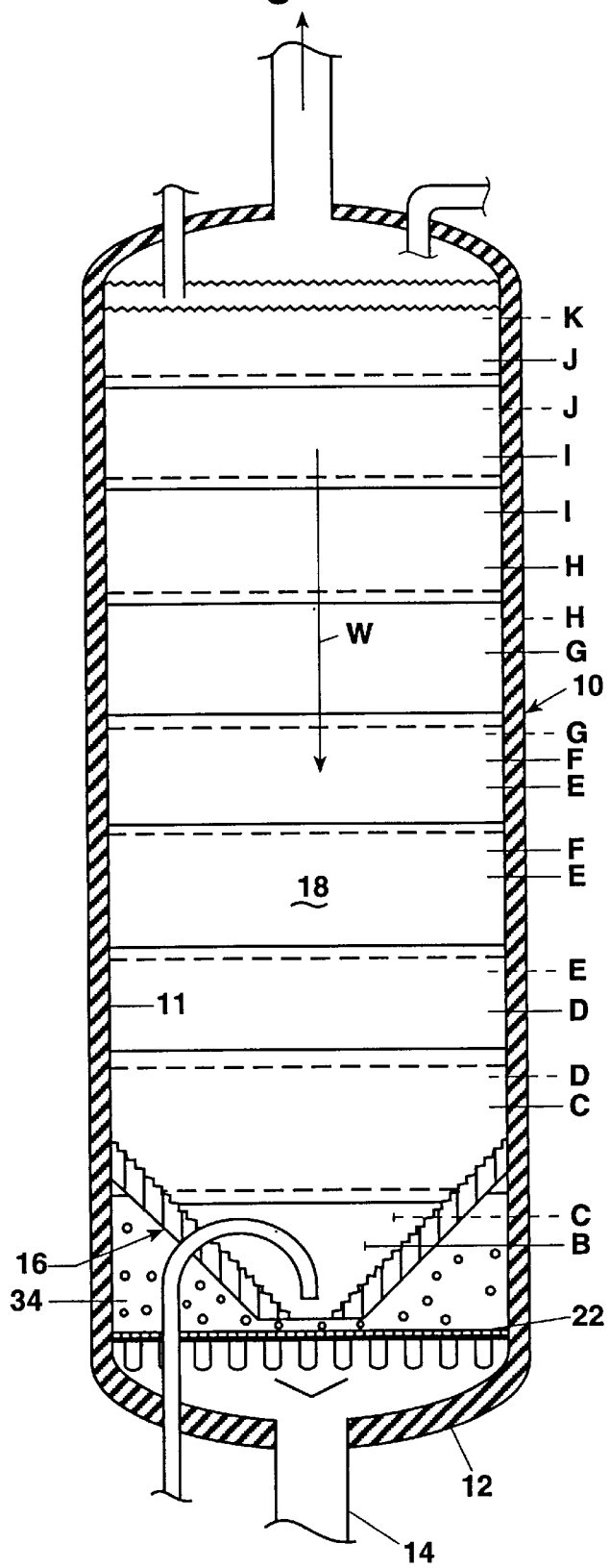
FIG. 5 is a partial cross-sectional view of the reactor in FIG. 9 of copending patent application Ser. No. 08/497,638 filed Jun. 30, 1995, now U.S. Pat. No. 5,599,440 in which catalyst is moving downwardly in a plug-flow fashion.
Figure 6:
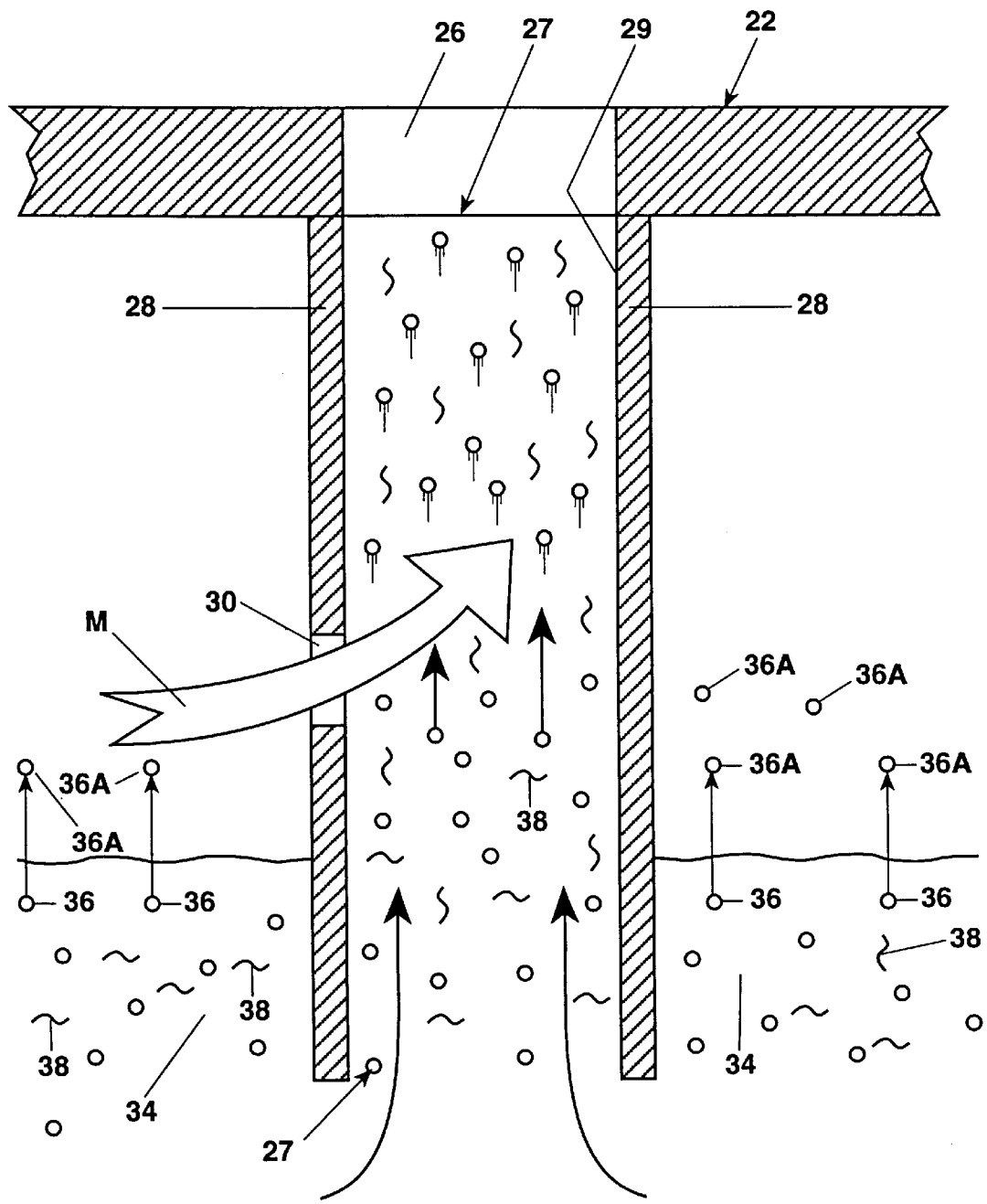
FIG. 6 is an enlarged sectional-view illustrating the mixture of liquid hydrocarbon and hydrogen-containing gas flowing turbulently upwardly through a hollow riser and past the opening in the hollow riser, with hydrogen gas flowing from a suitable gas head, through the opening in the hollow riser and into the turbulent flowing mixture of liquid hydrocarbon and hydrogen containing gas for admixing with the turbulent flowing mixture.
Figure 7:
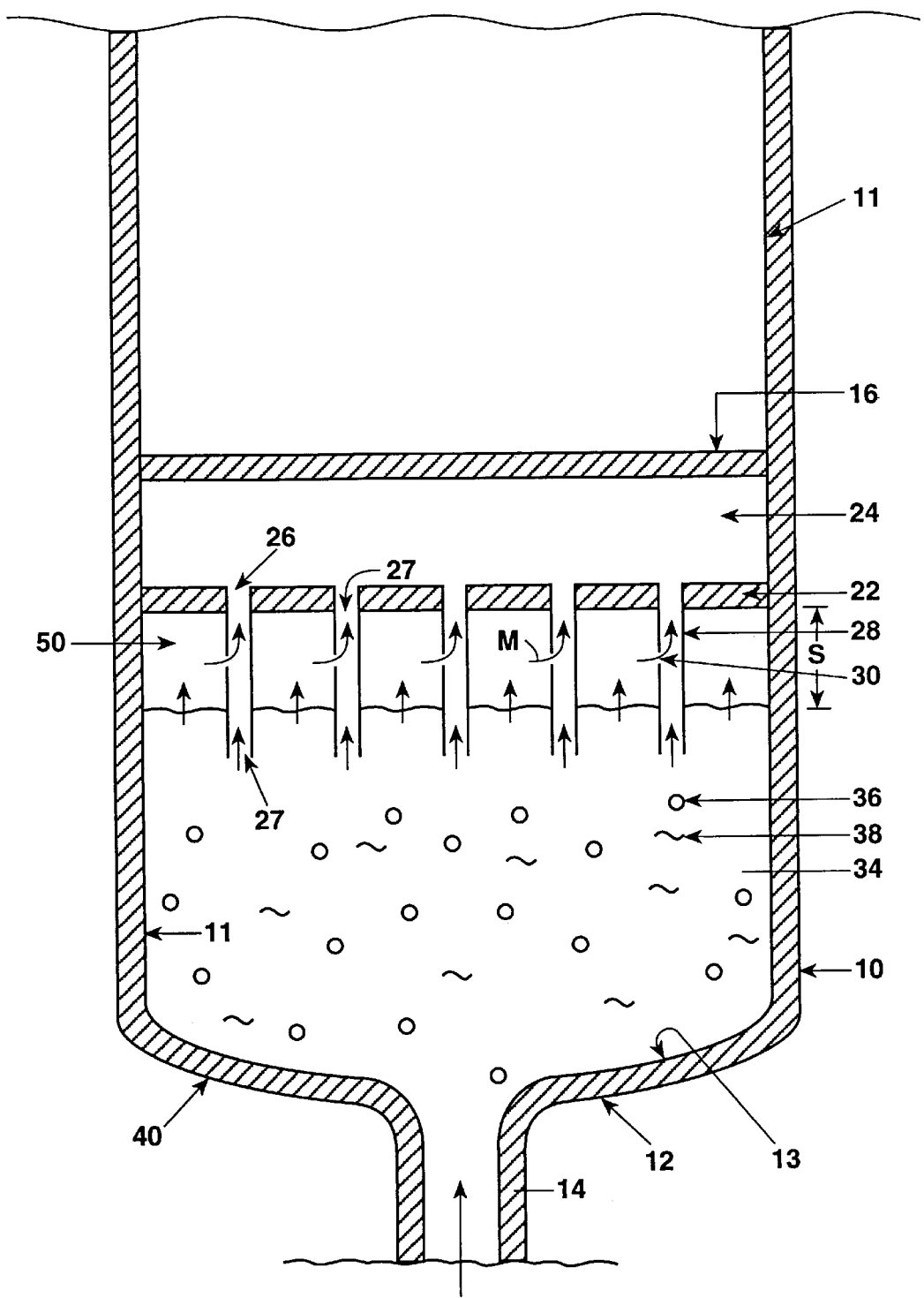
FIG. 7 is an enlarged partial elevational sectional-view of the lower part of the reactor illustrating the flow of hydrogen gas and the liquid hydrocarbon.

A "plug flow" of the catalyst bed 10 is illustrated in FIGS. 4 and 5 herein (which are identical to FIGS. 8 and 9 but for reference numeral descriptors In the fully incorporated copending application Ser. No. 08/497,638 filed Jun. 30, 1995) and may be best described as when a lowermost volumetric layer A is removed, the next volumetric layer B flows downwardly to replace the lowermost volumetric layer B and assumes a new position as a lowermost volumetric layer B. The removed lowermost volumetric layer A is replaced with an upper volumetric layer J. The procedure is again repeated (as best shown by the dotted line representations In FIG. 5) by removing the lowermost volumetric layer B and causing the next volumetric layer C to flow downwardly in a plug-like fashion to replace the lowermost volumetric layer B and assume a new position as a lowermost volumetric layer C. The removed lowermost volumetric layer B is replaced with an upper volumetric layer K. The procedure may be continually repeated to define a downwardly plug-flowing catalyst bed 18 which is moving in direction of arrow W in FIG. 5.

The reactor vessel 10 also contains a generally (grid-like structure) circular plate member 22 (i.e. a distributor tray), that is secured to the internal generally cylindrical wall 11 such that a plenum (or inlet) chamber 24 is produced between the catalyst bed support means 16 and the generally circular plate member 22. A bottom header, generally illustrated as 40, is defined by the distance between the inner surface 13 of the bottom domed closure 12 and the plate member 22. The mixture 34 of the hydrogen-containing gas 36 and the liquid hydrocarbon stream 38 is supported by the bottom domed closure 12, more specifically by the surface 13 of the bottom domed closure 12, such as to occupy a volumetric portion in the bottom header 40. The distance between the level of the mixture 34 and the plate member 22 defines a static head S wherein a suitable gas head 50 comprises evolved hydrogen-containing gas 36A that has originated from the mixture 34 of the hydrogen-containing gas 36 and the liquid hydrocarbon stream 38.

As was previously mentioned and indicated, the term "evolved hydrogen-containing gas" comprises the hydrogen-containing gas 36 that is being introduced into the reactor vessel 10 along with the liquid hydrocarbon stream 38, any hydrogen gas that has evolved from the liquid hydrocarbon stream 38 itself, and hydrogen-containing gas 36 that solutionized and/or dissolved into and/or with the liquid hydrocarbon stream 38 and which has subsequently evolved from the liquid hydrocarbon stream 38, especially after introduction Into the reactor vessel 10.

The plate (grid-like structure) member 22 has a plurality of openings 26 that respectively communicate with a plurality of tubes or hollow risers 28 that are bound to the plate member 22. Stated alternatively, the plate member 22 includes a plurality or multiplicity of tubes or hollow risers 28 forming openings 26 through the plate member 22. At least one of the tubes or hollow risers 28 (preferably all of them) contains a tubular bore 29 and at least one aperture or opening 30 and a pair of open ends, both generally illustrated as 27.

The length of the tubes or hollow risers 28 may be selected such that the suitable gas head 50 is formed underneath the plate member 22 and/over the level of the mixture 34 to suppress surges in the feed stream(s) entering the bottom header 40 from the conduit 14. Tubes or hollow risers 28 receive the mixture 34 of hydrogen-containing gas 36 and liquid hydrocarbon stream 38 and pass the same through the openings 26 to enter the plenum (or Inlet) chamber 24.

Figure 2:
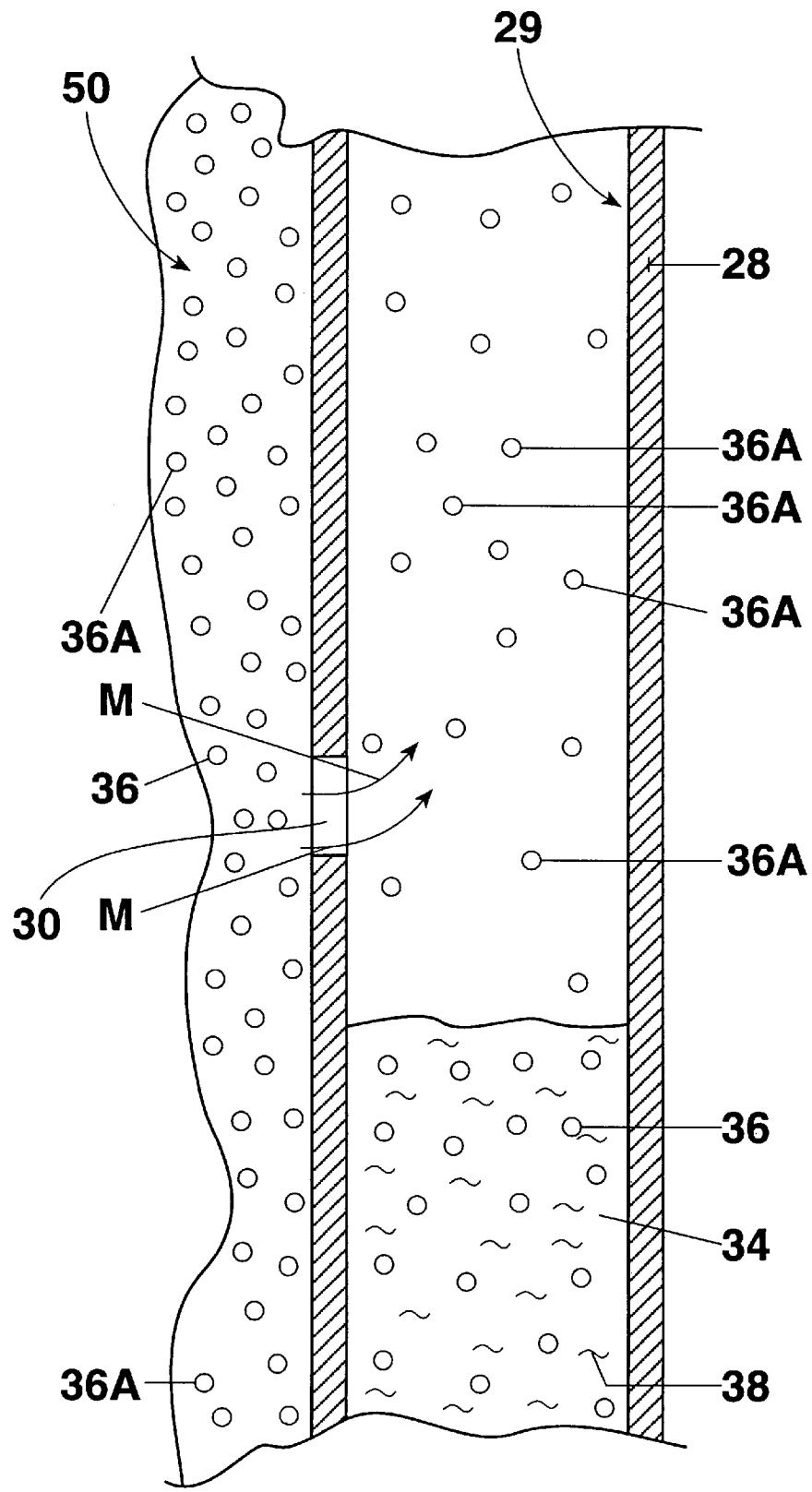
FIG. 2 illustrates a mixture of hydrogen-containing gas and liquid hydrocarbon flowing into a hollow riser having an opening, with the mixture not having passed the opening in the hollow riser, and further illustrating evolved hydrogen-containing gas passing from a suitable gas head and into a space In the hollow riser above a level of the mixture of hydrogen-containing gas and liquid hydrocarbon contained therein.
Figure 3:
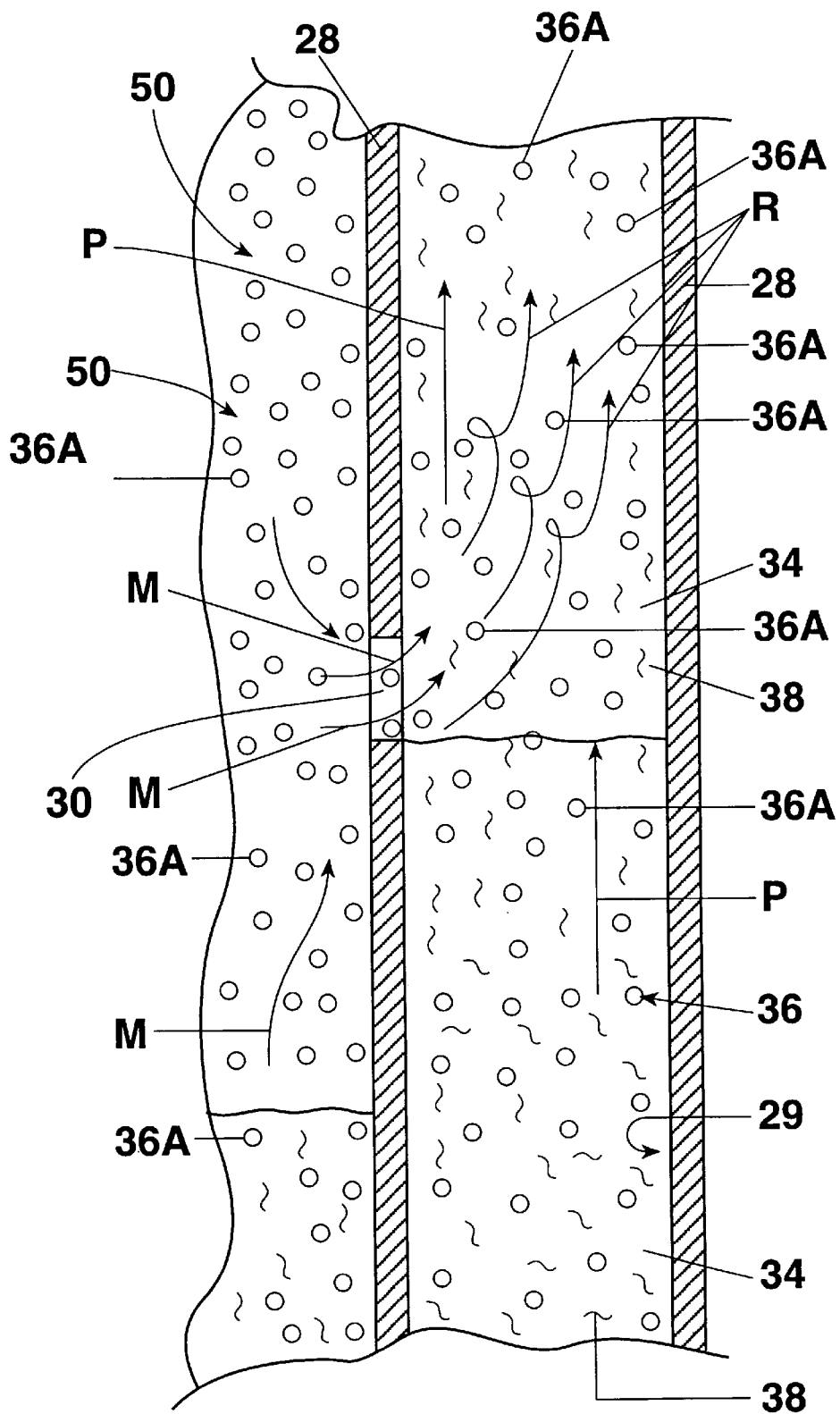
FIG. 3 illustrates the mixture of liquid hydrocarbon and hydrogen-containing gas flowing upwardly through a hollow riser and past the opening in the hollow riser, with evolved hydrogen-containing gas passing and/or flowing from a suitable gas head, through the opening in the hollow riser and into the mixture of liquid hydrocarbon and hydrogen-containing gas for admixing with the same.

As the mixture 34 of the hydrogen-containing gas 36 and the liquid hydrocarbon stream 38 flows through the respective hollow risers 28, the evolved hydrogen-containing gas 36A within the static head S (or the suitable gas head 50) enters or passes through the apertures 30, as best shown in FIGS. 2 and 3. More specifically and as further best shown in FIGS. 2 and 3, as the mixture 34 flows through conduit 14 and into the bottom header 40, evolved hydrogen-containing gas 36A commences to evolve from the mixture 34 and the suitable gas head 50 begins to form. Continual flow of the mixture 34 into the bottom header 40 fills a lower portion of each of the hollow risers 28 and a volumetric portion of the bottom header 40 such as to produce the suitable gas head 50, all as best shown in FIG. 1.

The suitable gas head 50 has a pressure that is greater than the pressure of the mixture 34 such that with continual introduction of the mixture 34 into the bottom header 40, the mixture 34 commences to flow up and through each of the hollow risers 28 and out of the openings 26 and into the plenum (or inlet) chamber 24. When the suitable gas head 50 is formed and/or begins to form, evolved hydrogen-containing gas 36A commences to flow in direction of the arrows M and through the opening(s) 30 in each of the hollow risers 28; that is, evolved hydrogen-containing gas 36A commences to flow towards a lower pressure zone.

FIG. 2 illustrates the mixture 34 flowing into each of the hollow riser(s) 28 but not to the point of passing by the opening(s) 30, and evolved hydrogen-containing gas 36A passing In direction of the arrows M from the suitable gas head 50, through opening(s) 30 in each of the hollow risers 28, and into the space in each of the hollow risers 28 above the mixture 34 contained therein. Obviously as further shown in FIG. 2, as the mixture 34 commences to flow through the respective tubular bores 29 and up each of the hollow risers 28, some of the hydrogen-containing gas 36 evolves out of and/or from the mixture 34 such as to commingle with and/or admix with the evolved hydrogen-containing gas 36A entering through opening(s) 30 in the hollow riser(s) 28. FIG. 3 illustrates the mixture 34 flowing in the direction of the arrows P and in a manner of turbulent arrows R and passing each of the opening(s) 30 in the hollow riser(s) 28 with evolved hydrogen-containing gas 36A passing and/or flowing in direction of arrows M from the suitable gas head 50, through opening(s) 30 in each of the hollow risers 28, and into the mixture 34 for admixing with the same.

It has been discovered that by providing each of the hollow risers 28 with an aperture 30 wherethrough the evolved hydrogen-containing gas 36A passes to be admixed with the mixture 34 offers the following advantages: (i) provides a good steady and smooth flow of hydrogen-containing gas 36 and liquid hydrocarbon stream 38 into the plenum (or inlet) chamber 24; (ii) the flow distribution of the mixture 34 through the openings 26 of the plate member 22 is insensitive to the levelness of the circular plate member 22 or to the varying liquid level in the bottom header 40; (iii) there is intimate remixing of hydrogen-containing gas 36 (i.e. evolved hydrogen-containing gas 36A and hydrogen-containing gas 36) in each of the hollow risers 28; and (iv) there is a high level of turbulence (see arrows R in FIG. 3) in an upper exit section (i.e. an upper section of each hollow risers 28 contiguous to or at openings 26 of the plate member 22) to promote break-up of bubbles of hydrogen-containing gas 36 and/or evolved hydrogen-containing gas 36A.

The size of the opening(s) 30 is carefully chosen to control the liquid level safely above the bottom of the riser 28 and also safely below the opening(s) 30. If the opening(s) 30 is too large, liquid will cover the opening(s) 30 from a decrease in the size of the gas head 50. If the opening(s) 30 is too small, the liquid level will descend from an increase in the size of the gas head 50, even to the point where the liquid level will uncover the lower open end 27 of at least one of the risers 28. This uncovered riser would then allow a large burst of gas to pass up that riser and disturb the even flow of gas and liquid in the plenum. Those possessing the ordinary skill in the art can readily adjust the size of the gas head 50, the flow of liquids/gas through the riser(s) 28, and the size of the opening(s) 30 in the riser(s) 28 such that the liquid level is maintained between the opening(s) 30 and the lower open end 27 of the riser(s) 28 from the Bernoulli principles found in any fluid flow or hydraulics engineering book, such as by way of example and fully incorporated herein by reference thereto: Momentum, Heat, and Mass Transfer, 2nd Edition by Bennett & Myers c 1962, 1974 by McGraw-Hill Inc.

Without the opening(s) 30, there would be violent slugging of gas and liquid up the riser(s) 28 at random locations as the rapidly varying liquid height exposes the bottom open end(s) 27 of different risers 27. This leads to large gas bubbles getting to the bottom of the catalyst bed support means 16, rather than the gentle, steady rise of many small gas bubbles.

Thus, by the practice of the present invention, there is provided a distributor assembly for hydroprocessing a hydrocarbon mixture 34 of hydrogen-containing gas 36 and liquid hydrocarbon 38 that is flowing (preferably upflowing) through a hydroconversion reaction zone containing a bed 18 of catalyst. As previously indicated, the circular plate member 22 has a structure defining at least one opening 26. At least one tube member or hollow riser 28 with a tubular bore 29 (see FIGS. 2 and 3) is bound to the plate member 22 such that the tubular bore 29 communicates with the at least one opening 26. The at least one tube member or hollow riser 28 has at least one tubular aperture or opening 30 in a side thereof. As best shown in FIGS. 2 and 3, opening 30 has an axis (not identified) that is normal or perpendicular to an axis (not identified) of the hollow-riser 28.

Thus further by the practice of the present invention, there is provided the reactor 10 having the internal cylindrical wall 11 and the catalyst bed support means 16 secured to the internal wall 11 for supporting the catalyst bed 18. As previously indicated, the distributor assembly is secured to the Internal cylindrical wall 11. More specifically with respect to the distributor assembly, the plate member 22 is secured to the cylindrical wall 11 of the reactor 10 and has a structure defining at least one opening 26. More specifically further and as previously indicated, the at least one tube member or hollow member 28 of this invention, has the tubular bore 29 and is bound to the plate member 22 such that the tubular bore 29 communicates with the at least one opening 26. Each of the tube members or hollow risers 28 has a tubular opening 30 in the side thereof and a pair of open ends.

Thus yet further by the practice of the present invention, there is provided a method for hydroprocessing a hydrocarbon feed stream that is flowing through a hydrocarbon reaction zone having a bed of catalyst comprising the steps of: (i) forming at least one tubular zone in a reactor zone containing a hydrocarbon reaction zone having a bed of catalyst; (ii) flowing a mixture of hydrogen-containing gas and liquid hydrocarbon into the reactor zone to produce evolved hydrogen-containing gas; and (iii) flowing the mixture of hydrogen-containing gas and liquid hydrocarbon through the tubular zone while admixing therewith the evolved hydrogen-containing gas.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the Invention as set forth.

We claim:

1. A method for mixing a liquid hydrocarbon with a hydrogen-containing gas in a reactor comprising the steps of:

a) passing hydrogen-containing gas and liquid hydrocarbon into a reactor comprising a vessel with an internal cylindrical wall; a catalyst bed support means secured to the internal cylindrical wall of the vessel; a plate member secured to the internal cylindrical wall of the vessel and having a structure defining at least one opening; at least one tube member having a tubular bore and bound to the plate member such that the tubular bore communicates with the at least one opening; and the at least one tube member including at least one tubular opening in a side thereof and an open bottom end;

b) forming a liquid level of the liquid hydrocarbon below the plate member and an evolved hydrogen-containing gas between the liquid level and the plate member;

c) passing at least a portion of the liquid hydrocarbon through the open bottom end of the tube member;

d) passing at least a portion of the hydrogen-containing gas through the tubular opening for mixing with the liquid hydrocarbon in the tubular bore of the tube member;

e) passing the mixture of liquid hydrocarbon and hydrogen-containing gas from the tubular bore of the tube member through the at least one opening in the plate member.

2. A method of hydroprocessing a hydrocarbon feed stream that is flowing through a hydroconversion reaction zone, comprising:

a) mixing a liquid hydrocarbon with a hydrogen-containing gas in a reactor which contains a catalyst bed supported on a catalyst bed support means according to the method of claim 1; and b) passing the mixture of liquid hydrocarbon and hydrogen-containing gas into the catalyst bed supported on the catalyst bed support means.

3. The method of claim 1 wherein the tube member has a tubular axis and the at least one tubular opening has an opening axis that is generally normal to said tubular axis.

\* \* \* \* \*